United States Patent [19]

Burandt

[11] Patent Number: 4,578,993
[45] Date of Patent: Apr. 1, 1986

[54] FAILURE DETECTION SYSTEM FOR GEARED ROTARY ACTUATOR MECHANISM

[75] Inventor: Wesley A. Burandt, Rockford, Ill.

[73] Assignee: Sundstrand Corporation, Rockford, Ill.

[21] Appl. No.: 565,675

[22] Filed: Dec. 30, 1983

[51] Int. Cl.[4] .................. B64C 13/50; G01M 13/02
[52] U.S. Cl. ..................................... 73/162; 74/674; 244/75 R
[58] Field of Search ............ 73/162; 244/75 R, 76 A, 244/231; 74/674

[56] References Cited

U.S. PATENT DOCUMENTS

| | | | |
|---|---|---|---|
| 2,371,607 | 3/1945 | Collins | 73/162 X |
| 2,856,770 | 10/1958 | Palsson | 73/162 |
| 2,981,103 | 4/1961 | Livezey | 73/162 |
| 3,008,355 | 11/1961 | Grudin | 74/301 |
| 3,103,004 | 9/1963 | Murray | 340/271 |
| 3,146,434 | 8/1964 | Sharples | 340/267 |
| 3,195,350 | 7/1965 | Reed | 73/162 |
| 3,203,275 | 8/1965 | Hoover | 74/665 |
| 3,611,800 | 10/1971 | Howlett et al. | 73/162 |
| 3,640,150 | 2/1972 | Lerner et al. | 74/674 |
| 3,680,373 | 8/1972 | Kearfolt | 73/162 |
| 4,079,902 | 3/1978 | Ryzhka et al. | 244/75 R |
| 4,406,934 | 9/1983 | Elszasz | 200/61.39 |

OTHER PUBLICATIONS

"Load Carrying Capacity of Spur Gears", Ueno et al., Bull. JSME (Japan) vol. 16, No. 92, (Feb. 1973) pp. 395-406.

Primary Examiner—Daniel M. Yasich
Attorney, Agent, or Firm—Wood, Dalton, Phillips, Mason & Rowe

[57] ABSTRACT

A failure detection mechanism for a geared rotary actuator having plural output stages. Each output stage has a planetary gearing set and the failure detection mechanism senses relative movement between planet gear shafts of adjacent planetary gearing sets when there is normal drive through one planetary gearing set and a back-drive through the other. The failure detection mechanism includes structure operable when a failure is sensed to either prevent further drive through the geared rotary actuator, or to activate mechanism to signal a pilot of an airplane that the failure has occurred.

19 Claims, 7 Drawing Figures

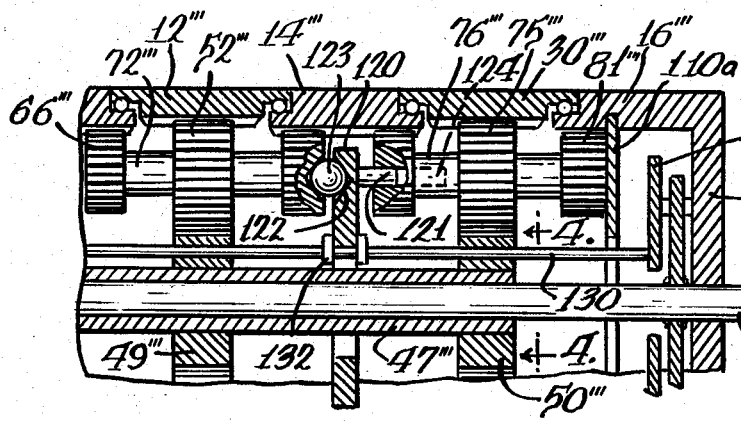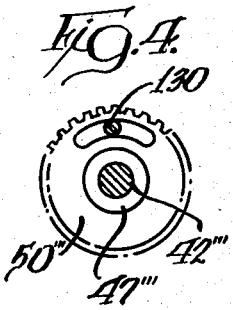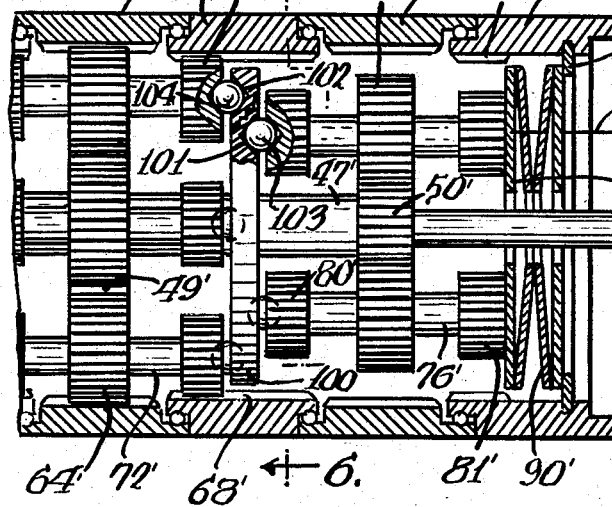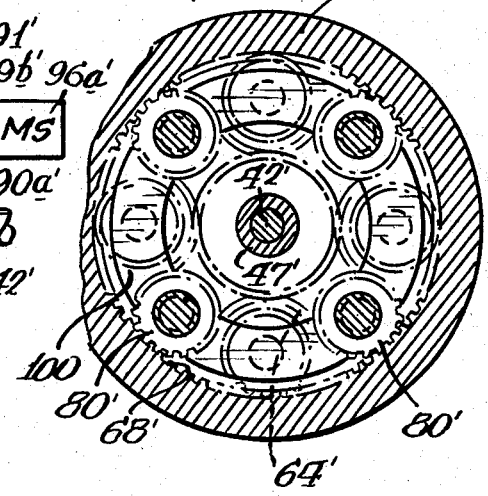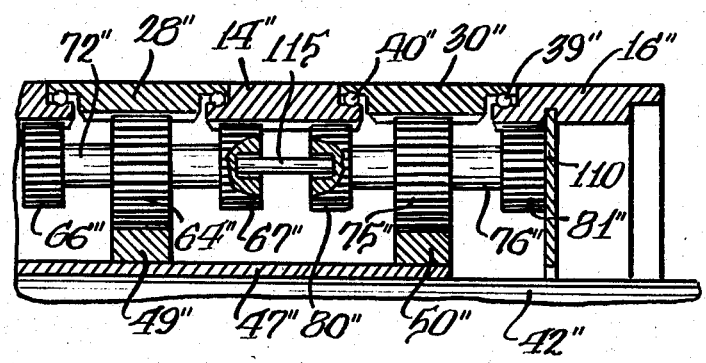

FAILURE DETECTION SYSTEM FOR GEARED ROTARY ACTUATOR MECHANISM

DESCRIPTION

1. Technical Field

This invention pertains to failure detection mechanism and, more particularly, to such mechanism as used between the output stages of a geared rotary actuator. The failure detection mechanism detects a failure between output stages of a geared rotary actuator as used for positioning of an aircraft flight control panel by sensing means which can operate to either jam or brake the actuator when a failure occurs to prevent further inadvertent loading within the panel or operate a switch to notify the pilot of the failure but permit continued operation of the aircraft.

2. Background Art

Aircraft, such as the F-16 and the F-18, utilize multiple-stage geared rotary actuators for positioning of the leading edge flaps. A multiple-stage geared rotary actuator of that type has an inherent failure mode that could fatigue the flight control panel of the aircraft if the inherent failure mode goes undetected. Such fatigue could ultimately result in loss of the flight control panel.

The geared rotary actuator is constructed with multiple-stage outputs, with each stage having a planetary gearing set. Each planetary gear set includes a fixed ring gear and a ring gear connected to the panel. The possibly undetected inherent failure mode is the result of a broken sun gear of a planetary gearing set or the input drive shaft which connects adjacent planetary gearing sets. This failure is difficult to detect, because the remaining output stages that can drive the panel will back-drive the remaining output stages through the panel being controlled. This introduces loading within the panel which it is not designed to carry.

DISCLOSURE OF THE INVENTION

A primary feature of the invention is to provide a failure detection mechanism for use with geared rotary actuators which is lightweight and low-cost and can be protected from the environment by being mounted within the housing of the actuator and which is not loaded during normal operation, so that a dormant failure of the failure detection mechanism cannot occur.

More particularly, the failure detection mechanism can be of different constructions to operate in either of two modes, with one mode being to jam the drive input to the geared rotary actuator or to brake the drive input and, therefore, stop the operation; or permit the operation to continue in a second mode, with the failure being sensed and a signal sent to the aircraft cockpit to notify the pilot that a failure has occurred. This gives the pilot the option to continue the flight and have the geared rotary actuator checked out on the ground after completion of the flight.

Another feature of the invention is to provide failure detection mechanism between output stages of a geared rotary actuator wherein each of the output stages has a planetary gearing set and when there is a failure in one stage there is a misalignment between elements of the planetary gearing sets, with this misalignment being sensed to indicate a failure. In the preferred embodiments, the relative movement between planet gear shafts in adjacent planetary gearing sets is sensed, since the relative movement therebetween upon failure of a drive in an output stage is much greater than the misalignment between ring gears of the output stages which are connected to the control panel of the aircraft. Therefore, a small output misalignment error between adjacent output ring gears which would result from the failure of a sun gear of the planetary gearing set results in a relatively large relative movement and error between adjacent planet gear shafts which enables the use of relatively simple, lightweight and low-cost structure for sensing the failure.

An object of the invention is to provide a failure detection mechanism for detecting a failure in a geared rotary actuator utilizing multiple sets of planetary gearing normally driven from a power source to drive multiple output stages connected to a common movable member which may slightly deform when moved by a drive from less than all said output stages comprising, means for sensing relative movement between elements of adjacent sets of planetary gearing resulting from one set of planetary gearing being driven from said power source and the other set of planetary gearing having elements driven by movement of said common movable member rather than by the power source.

BRIEF DESCRIPTION OF THE DRAWINGS

FIG. 3 is a fragmentary central vertical section of a geared rotary actuator having a further embodiment of the invention and which senses a failure and stops the drive;

FIG. 4 is a sectional view, taken generally along the line 4—4 in FIG. 3;

FIG. 5 is a fragmentary central vertical section of a geared rotary actuator embodying a further embodiment of the invention and which senses a failure and stops the drive;

FIG. 6 is a vertical section, taken generally along the line 6—6 in FIG. 5; and

FIG. 7 is a fragmentary vertical sectional view of the embodiment of the invention shown in FIG. 1.

BEST MODES FOR CARRYING OUT THE INVENTION

Figure 1:
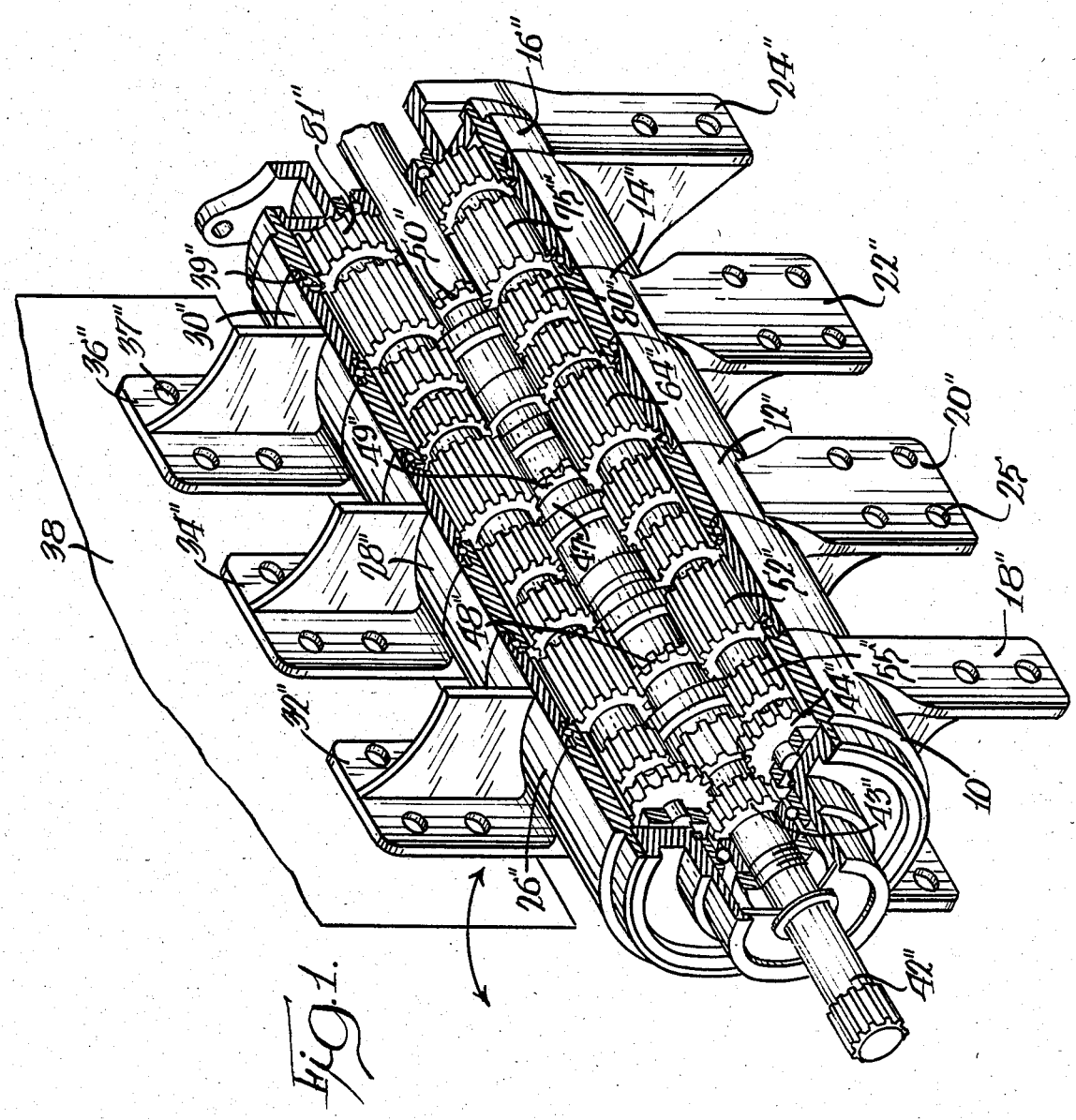
FIG. 1 is a perspective view of a geared rotary actuator having one embodiment of the failure detection mechanism and with parts broken away.
Figure 2:
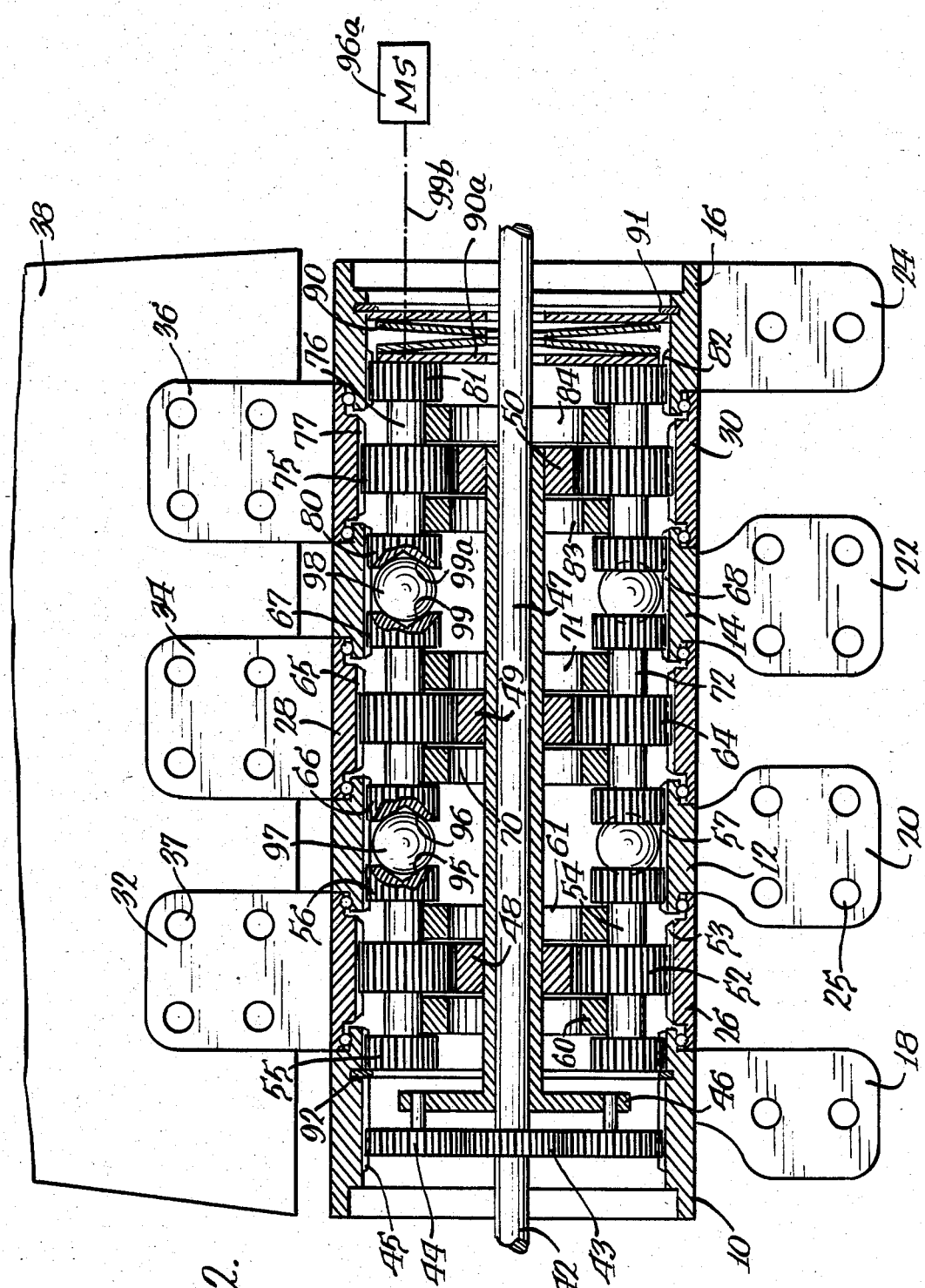
FIG. 2 is a central vertical section of a geared rotary actuator showing another embodiment of the invention and which senses and signals a failure.

The actuator, as seen in FIG. 2, has a housing made up of a series of relatively rotatable annular housing sections, with a series of the housing sections being secured to a fixed member, such as a frame member of an aircraft, and housing sections alternating therewith defining stage outputs connectable to a primary or secondary flight control surface of an aircraft, such as a leading edge flap. More particularly, the housing sections 10, 12, 14 and 16 each have a bracket 18, 20, 22 and 24, respectively, provided with openings 25 through which fastening means can extend for fastening the brackets to the fixed frame member of the aircraft. As shown in FIG. 2, the multiple-stage outputs are three in number and are provided by the housing sections 26, 28 and 30 having the integral brackets 32, 34, and 36, respectively, with openings 37 through which fastening means can extend for securing the brackets to spaced portions of a panel 38 which can be a common movable member as, for example, a primary or secondary flight control surface of an aircraft, such as a leading edge flap and which can have some flexure between the spaced portions. The interrelation of the housing sections is also seen in FIGS. 1 and 7. The output stages are rotatable relative to fixed housing sections by means of bearings, with the bearings 39 and 40 rotatably mounting the output stage housing section 30 relative to the fixed housing sections 14 and 16.

The geared rotary actuator is connected to a high-speed, low-torque power source (not shown) and provides a low-speed, high-torque output for moving the panel 38. The geared rotary actuator uses a plurality of planetary gearing sets associated one with each of the output stages, with the structure best shown in FIG. 1 and FIG. 2 which shows a second embodiment of the invention. The construction of the housing and the planetary gearing sets is basically the same in all of the embodiments and the following description thereof is with particular reference to FIG. 2.

A drive shaft 42 extends through the geared rotary actuator and may interconnect with drive shafts of additional geared rotary actuators in line with the one shown. A primary input planetary gearing set includes a sun gear 43 on the drive shaft which meshes with planet gears 44 which mesh with an internal ring gear 45 integral with the fixed housing section 10. The planet gears 44 are rotatably mounted on a carrier 46 integral with a tubular input shaft 47 surrounding the drive shaft 42. The input shaft 47 has a series of sun gears 48, 49 and 50 fixed thereon.

The sun gear 48 meshes with main planet gears 52 which are geared to a ring gear 53 on the housing section 26 which, through the bracket 32, connects to the panel 38. Associated with the main planet gears 52 are two additional sets of planet gears on common planet gear shafts 54. The planet gears 55 of a first set mesh with the fixed ring gear 45 and the planet gears 56 of the second set mesh with a ring gear 57 on the fixed housing section 12. Support rings 60 and 61 positioned between the main planet gears and the additional sets of planet gears 55 and 56 maintain alignment of the planet gear shafts 54. With the input shaft 47 being driven, the resulting rotation of the sun gear 48 causes rotation of the planet gears 52, with the planet gears advancing rotatively relative to the input shaft 47, as controlled by the planet gears 55 and 56 meshing with the fixed ring gears 45 and 57, whereby the ring gear 53 is caused to rotate the housing section 26 and the bracket 32 associated therewith for movement of the panel 38.

The output stage having the sun gear 49 is similarly constructed, including the main planet gears 64 engaging a ring gear 65 on the movable housing section 28 and the two sets of planet gears 66 and 67, with the planet gears 66 in mesh with the ring gear 57 and the planet gears 67 in mesh with a ring gear 68 on the fixed housing section 14. Support rings 70 and 71 coact with planet gear shafts 72 to maintain alignment thereof.

The output stage having sun gear 50 is also similarly constructed. The sun gear 50 meshes with a plurality of planet gears 75 on planet gear shafts 76 and the planet gears engage a ring gear 77 on the movable housing section 30. The planet gear shafts 76 carry the sets of planet gears 80 and 81, with planet gears 80 meshing with the ring gear 68 and the planet gears 81 meshing with a ring gear 82 on the fixed housing section 16. The support rings 83 and 84 provide for alignment of the planet gear shaft 76.

When the panel 38 is to be moved, the drive shaft 42 is rotated from a power source, with resulting rotation of the input shaft 47 and the planetary gearing sets operate to cause rotation of the movable housing sections and, thus, movement of the panel 38. It is possible to have a potential failure mode resulting from a broken sun gear or a break in the input shaft 47 between the output stages. This failure is difficult to detect because one or more output stages that are still driven will cause movement of the panel 38 and the output stage which is not being driven from the input shaft will be back-driven through the panel 38. This introduces loading within the panel, for which it is generally not designed to carry, and there will be some deformation or flexure within the panel. More particularly, assuming the sun gear 48 as shown in FIG. 2 is broken, the output stages having the brackets 34 and 36 will be operable to move the panel 38. However, the output stage having the bracket 32 is not being driven through the planetary gearing set and, thus, there is excessive loading on the panel at the brackets 34 and 36 which causes stresses within the panel sufficient to result in a flexure of the panel whereby the bracket 32 will have some movement relative to the brackets 34 and 36. Continued flexing of the panel could lead to a fracture and loss thereof.

The geared rotary actuator, as described, is generally conventional in the art and various embodiments of failure detection mechanism associated therewith to detect a failure will now be described.

The failure detection mechanism can operate on either one of two basic principles. One principle is to stop the drive through the geared rotary actuator either by jamming the gearing or setting of a brake. The other principle is to sense the failure and send a signal to the aircraft cockpit notifying the pilot that a failure has occurred and the pilot then has the option to continue the flight and have the geared rotary actuator checked on the ground.

Two embodiments of the invention which stop the drive through the geared rotary actuator are shown in FIGS. 1 and 7, and FIGS. 3 and 4, and embodiments wherein a signal is sent to the pilot are shown in the two embodiments illustrated in FIG. 2, and FIGS. 5 and 6.

Referring to FIG. 2, failure is detected by ball and ramp sensing mechanism associated with the planet gear shafts of the planetary gearing sets. The aligned planet gear shafts 54, 72 and 76 are in alignment and are urged toward each other by Belleville springs 90 acting against the planet gears 82 and held in position in the fixed housing section 16 by a retaining member 91. The Belleville springs 90 urge the aligned planet gear shafts toward each other, with the planet gears 55 being held against the force of the spring by a retaining member 92. The planet gear shafts 54 and 72 have counterbores at their adjacent ends providing opposed inclined ramps 95 and 96, respectively, and a ball 97 is seated therein. Typically, there are nine planet gear shafts in a planetary gearing set, so that there are nine balls 97 associated with the ramps formed in the ends of the planet gear shafts. Similarly, a series of balls 98 are associated with ramps 99 and 99a at adjacent ends of the planet gear shafts 72 and 76.

When a previously described failure results in a failure of the drive from the input shaft 47 through one of the planetary gearing sets, this will be sensed by the ball and ramp mechanisms associated with the planet gear shafts in the failed planetary gearing set. More particularly, assuming there is a failure in the planetary gearing set associated with the bracket 32 that connects with the panel 38, there will be the normal drive through the planetary gearing sets associated with the brackets 34 and 36 and the unusual loading of the panel 38 results in movement of the bracket 32 relative to the bracket 34 with resulting relative movement between the ring gears 53 and 65 and the planet gear shafts 54 and 72. This relative movement results in the balls 97 shifting from their full-seated position in the ramps at the end of the planet gear shafts 54 and 72 which forces a separation therebetween against the urging of the Belleville springs 90 engaging a plate 90a. This movement forces planet gear shafts 76 to the right which is sensed by a link, indicated diagrammatically at 99b, and engaging the plate 90a which can operate a micro-switch 96a extending to an indicating unit in the aircraft cockpit which would notify the pilot that a failure has occurred.

When the described failure occurs, there is a relatively large differential rotary movement of the adjacent planet gear shafts 54 and 72. Any misalignment between the output stage ring gears 53 and 65 is multiplied by several times at the adjacent planet gear shafts. Therefore, for a small output misalignment error, a relatively large error is generated between adjacent planet gear shafts.

A variation of the embodiment of FIG. 2 would be to use the separating force to ground a disc brake between the drive shaft 42 and the actuator housing.

In the event that the planet gear shafts of the planetary gearing sets are not designed to be in alignment, as shown in the embodiment of FIG. 2, it is possible to use a construction as shown in the embodiment of FIGS. 5 and 6. FIG. 5 is a fragmentary view of the right-hand end of a geared rotary actuator similar to that shown in FIG. 2 and with similar parts being given the same reference numerals with a prime affixed thereto. In FIG. 5, the planet gear shafts 72' and 76' of adjacent planetary gearing sets are shown out of axial alignment and, therefore, the balls of the ball and ramp mechanism cannot coact directly with ramps defined by counterbores of aligned planet gear shafts. An annular ball carrier 100 in the form of a disc with a central opening to loosely fit over the input shaft 47' is positioned between each pair of adjacent planetary gearing sets and has its opposite faces provided with ramps 101 and 102 which are aligned with the counterbores of the planet gear shafts 72' and 76' and coact therewith to seat balls 103 and 104. When a failure occurs, as previously described, there is relative differential rotary movement of the planet gear shafts 72' and 76' which results in the balls moving from their fully-seated position in the ramps to sense the failure and obtain a separating force on adjacent planetary gearing sets which is sensed through the plate 90a' and the link 99b' for operation of the micro-switch 96a'.

The embodiments of the invention shown in FIGS. 1 and 7 and in FIGS. 3 and 4 provide for discontinuance of drive through the geared rotary actuator. One of these embodiments provides for jamming of the drive, with this embodiment shown in FIGS. 1 and 7. FIG. 7 illustrates sufficient of the basic geared rotary actuator as described in the embodiment of FIG. 2 to describe the embodiment and with comparable structure being given the same reference numerals with a double prime affixed thereto.

In the embodiment of FIGS. 1 and 7, the Belleville spring 90 is not utilized and a retaining member 110 engages against the planet gears 81" to coact with the previously-mentioned retaining member 92 at the other end of the geared rotary actuator to maintain a fixed distance between the planetary gearing sets. A pin 115 is extended between two adjacent aligned planet gear shafts. As shown in FIG. 7, the adjacent ends of the planet gear shafts 72" and 76" are provided with recesses sufficiently deep to hold a portion of the length of the pin 115. Upon the occurrence of a failure in one of the planetary gearing sets relative to the other, the relative movement between the planet gear shafts is sensed by the canting of the pin and the pin makes a fixed connection between the planet gear shafts to jam the actuator. A pin 115 would also be located between the planet gear shafts 54" and 72".

The second embodiment of the invention which results in stopping the drive through the geared rotary actuator is shown in FIGS. 3 and 4, with parts similar to those described in FIG. 2 being given the same reference numerals with a triple prime affixed thereto.

In the embodiment of FIGS. 3 and 4, the planet gear shafts of the planetary gearing sets are held between the retaining members 92 and 110a. The failure-sensing means includes an annular ball carrier 120 which surrounds the input shaft 47''' and which has a series of pins 121 extending from one face thereof guided within openings 124 formed in the ends of planet gear shafts 76'''. The opposite side of the ball carrier 120 has a series of ramps 122 which align with the counterbores in the planet gear shafts 72''' forming ramps and with a series of balls 123 seated in the ramps. Assuming there is a failure in one of the planetary gearing sets relative to the other resulting in relative movement between the planet gear shafts 72''' and 76''' the balls 123 move outwardly on their ramps to obtain a separating force which urges the ball carrier 120 toward the right and the pins 121 move further into the openings 124.

The ball carrier is associated with a push rod 130 connected to a rotary disc 130.5 associated with a disc brake 131 fixed to the drive shaft 42'''. A bracket 132 on the push rod 130 coacts with the ball carrier 120 whereby movement of the ball carrier is transmitted to the push rod. The movement exerted on the ball carrier 120 toward the right, as viewed in FIG. 3, as the ball moves outwardly on the ramps causes movement of the push rod 130. Movement of the push rod 130 acts upon the rotary disc grounding the disc brake 131 between the actuator housing 130.6 and the drive shaft 42'''. Alternatively, the push rod 130 could operate a switch if there is to be a signal to the aircraft cockpit, rather than a stopping of the drive. As will be evident from the description of the other embodiments, there will be a similar ball carrier located between the other planetary gearing sets and which is connected to the push rod 130.

Although not shown, it would also be possible to stall the geared rotary actuator by locating a ball between adjacent planet gear shafts of two planetary gearing sets, but only in association with one planet gear shaft of a planetary gearing set whereby, when there is relative movement of the planet gear shafts, this would tend to cock the planet support rings, such as planet support rings 60 and 61, of FIG. 2 and this would stall the actuator.

From the foregoing, it will be evident that several embodiments of failure detection mechanism have been disclosed for detecting a failure between output stages of a geared rotary actuator. The failure detection mechanism does not carry any load during normal operation, so that a dormant failure of the failure detection mechanism does not occur. The failure detection mechanism is of a light weight, which is important when incorporating into aircraft equipment and is a low-cost addition to the geared rotary actuator. The failure detection mechanism senses relative movement between output stages of the geared rotary actuator and avoids prolonged nondesigned loading on the flight control panels which, if undetected, could fatigue the panel to the point that the panel would be lost, with resulting loss of control of the aircraft.

I claim:

1. A failure detection mechanism for detecting a failure in a geared rotary actuator, said mechanism comprising: multiple sets of planetary gearing normally driven from a power source to drive multiple output stages connected to corresponding plural portions of a common movable member having some flexure between portions when moved by a drive from less than all said output stages, means for sensing a structural failure in one set of planetary gearing when another set of planetary gearing is operating to transmit the drive from the power source to the associated common movable member portion, said sensing means comprising means for sensing angular movement between elements of adjacent sets of planetary gearing resulting from one set of planetary gearing being driven from said power source and the other set of planetary gearing having failed whereby a signal is provided by said sensing means indicative of said failure.

2. A failure detection mechanism as defined in claim 1 wherein said planetary gearing sets each include at least one planet gear shaft and said means for sensing angular movement senses relative movement between said planet gear shafts.

3. A failure detection mechanism as defined in claim 1 wherein said sensing means includes means for jamming said planet gear shafts against continued relative movement.

4. A failure detection mechanism as defined in claim 1 wherein said sensing means activates a switch.

5. A failure detection mechanism as defined in claim 1 including a brake associated with the power source, and means responsive to said sensing means for activating said brake.

6. A failure detection mechanism as defined in claim 1 wherein said planetary gearing sets each include planet gear shafts which are said angularly movable elements, means urging said planet gear shafts of adjacent planetary gear sets toward each other, and said sensing means includes ball and ramp mechanism operable to exert a force acting against said urging means when said relative movement occurs.

7. A failure detection mechanism as defined in claim 6 wherein said planet gear shafts of adjacent planetary gear sets are in axial alignment and with said ramp mechanism having ramps formed on the ends of the planet gear shafts and a ball is positioned therebetween.

8. A failure detection mechanism as defined in claim 6 wherein said planet gear shafts of adjacent planetary gear sets are not in axial alignment, a ball ramp formed on the end of a plurality of said planet gear shafts, and a ball carrier positioned between the adjacent planetary gear sets and having a plurality of balls engageable in said ball ramps.

9. A failure detection mechanism for a geared rotary actuator which translates a high-speed low-torque drive input to a low-seed high-torque drive output for moving a movable member at plural connections to corresponding plural portions of the movable member having some flexure between said portions, said mechanism comprising: a drive input shaft, a plurality of spaced-apart planetary gearing sets each having a sun gear connected to the drive input shaft, a rotatable ring gear separately connected to a portion of said movable member and a plurality of planet gear shafts each having a main planet gear engaged between the sun and rotatable ring gears and a pair of planet gears one at each side of the main planet gear and engaging fixed ring gears alternating with said rotatable ring gears, whereby rotation of the drive input shaft causes movement of said movable member with said planet gear shafts advancing along said fixed ring gears, and means for sensing a structural failure in one of said planetary gearing sets when another planetary gearing set is operating to transmit the drive from the drive input shaft to its associated movable member portion, said sensing means comprising means for sensing a change in the angular disposition of a portion of said one planetary gearing set relative to the non-failed disposition of the other planetary gearing set during operation of the geared rotary actuator whereby a signal is provided by said sensing means indicative of said failure.

10. A failure detection mechanism as defined in claim 9 wherein said failure sensing means senses relative movement between said planet gear shafts as they advance along said fixed ring gears.

11. A failure detection mechanism as defined in claim 10 wherein said sensing means includes means for jamming said planet gear shafts against continued relative movement.

12. A failure detection mechanism as defined in claim 11 wherein said jamming means includes a pin extending between ends of adjacent planet gear shafts, and a recess in each of said shafts for receiving an end of the pin.

13. A failure detection mechanism as defined in claim 10 including means urging said planet gear shafts of adjacent planetary gear sets toward each other, and said sensing means includes ball and ramp mechanism operable to exert a force acting against said urging means when said relative movement occurs.

14. A failure detection mechanism as defined in claim 13 wherein said planet gear shafts of adjacent planetary gear sets are in axial alignment and with said ramp mechanism having ramps formed on the ends of the planet gear shafts and a ball is positioned therebetween.

15. A failure detection mechanism as defined in claim 13 wherein said planet gear shafts of adjacent planetary gear sets are not in axial alignment, a ball ramp formed on the end of a plurality of said planet gear shafts, and a ball carrier positioned between the adjacent planetary gear sets and having a plurality of balls engageable in said ball ramps.

16. A failure detection mechanism as defined in claim 9 wherein said sensing means activates a switch.

17. A failure detection mechanism as defined in claim 9 including a brake associated with the drive input shaft, and means responsive to said sensing means for activating said brake.

18. A failure detection mechanism as defined in claim 9 including means activated by said sensing means when a failure occurs, and means for transmitting a failure signal from said sensing means to said activated means including a push rod, and elongate openings in said sun gears through which said push rod extends.

19. A failure detection mechanism for a drive mechanism having an input shaft and plural drive output connections to corresponding plural portions of a common movable member having some flexure between said portions, said mechanism comprising: plural drive trains each connected to said input shaft and separately respectively connected to said movable member portions; and means for sensing a structural failure in one drive train when another drive train is operating to transmit the drive from the input shaft to its associated movable member portion, said sensing means comprising means for sensing a change in angular disposition of a portion of said one drive train relative to its non-failed disposition during operation of the drive mechanism whereby a signal is provided by said sensing means indicative of said failure.

* * * * *